(12) United States Patent
Kayma et al.

(10) Patent No.: US 8,714,991 B2
(45) Date of Patent: May 6, 2014

(54) BUSBAR ADAPTER COMPRISING A MOUNTING RAIL FOR ATTACHING A SWITCHING DEVICE

(75) Inventors: Joerg Kayma, Herborn (DE); Pierre Plath, Greifenstein (DE); Frank Kuester, Breitscheid (DE); Matthias Kienholz, Biebertal (DE)

(73) Assignee: Rittal GmbH & Co. KG, Herborn (DE)

( * ) Notice: Subject to any disclaimer, the term of this patent is extended or adjusted under 35 U.S.C. 154(b) by 112 days.

(21) Appl. No.: 13/558,434

(22) Filed: Jul. 26, 2012

(65) Prior Publication Data

US 2013/0189862 A1 Jul. 25, 2013

(30) Foreign Application Priority Data

Aug. 3, 2011 (DE) .......................... 10 2011 052 381

(51) Int. Cl.
*H01R 25/00* (2006.01)
*H02B 1/04* (2006.01)

(52) U.S. Cl.
USPC .......................................... 439/121; 361/636

(58) Field of Classification Search
USPC .......... 439/121, 532, 212, 545, 716; 361/636, 361/640
See application file for complete search history.

(56) References Cited

U.S. PATENT DOCUMENTS

| | | | | |
|---|---|---|---|---|
| 2,090,156 A | * | 8/1937 | Scholz | 219/545 |
| 3,150,907 A | * | 9/1964 | Petroske | 439/121 |
| 3,239,795 A | * | 3/1966 | Verrone | 439/121 |
| 3,273,103 A | * | 9/1966 | Ericson | 439/43 |
| 3,391,377 A | * | 7/1968 | Corl et al. | 439/116 |
| 3,716,683 A | * | 2/1973 | Hafer | 200/50.29 |
| 3,894,781 A | * | 7/1975 | Donato | 439/121 |
| 3,897,928 A | * | 8/1975 | Eisler | 249/78 |
| 3,933,403 A | * | 1/1976 | Rubesamen et al. | 439/121 |
| 3,963,294 A | * | 6/1976 | Heritage | 439/121 |
| 4,018,306 A | * | 4/1977 | Lyons | 182/148 |
| 4,163,595 A | * | 8/1979 | Vasseur | 439/121 |
| 4,343,223 A | * | 8/1982 | Hawke et al. | 89/8 |
| 4,510,368 A | * | 4/1985 | Schlienger et al. | 219/69.17 |
| 4,655,520 A | * | 4/1987 | Cummings | 439/111 |
| 4,749,358 A | * | 6/1988 | Soleanski | 439/119 |
| 4,768,964 A | * | 9/1988 | Zucchini | 439/110 |
| 4,828,505 A | * | 5/1989 | Shwisha | 439/119 |
| 6,017,251 A | * | 1/2000 | Rittmann | 439/716 |

(Continued)

FOREIGN PATENT DOCUMENTS

DE 4242704 C2 4/1995
DE 19515922 C1 8/1996

(Continued)

*Primary Examiner* — Amy Cohen Johnson
*Assistant Examiner* — Vladimir Imas
(74) *Attorney, Agent, or Firm* — Marshall & Melhorn, LLC

(57) ABSTRACT

A busbar adapter has a mounting rail for attaching a switching device to the busbar adapter, wherein the mounting rail can be attached to the busbar adapter at different positions. The mounting rail includes leg elements and the busbar adapter includes passages through which a respective one of the leg elements of the mounting rail extend with a latch from a first boundary surface of the passages on which the mounting rail rests, to a second boundary surface of the passages, such that the respective latch of the leg elements is, with a retaining surface thereof, arranged in a distance to the second boundary surface which corresponds to a dimension of a slider positively insertable between the retaining surface and the second boundary surface.

7 Claims, 5 Drawing Sheets

(56) References Cited

U.S. PATENT DOCUMENTS

| | | | | |
|---|---|---|---|---|
| 6,033,239 | A * | 3/2000 | Jaakkola et al. | 439/121 |
| 6,056,561 | A * | 5/2000 | Lin | 439/121 |
| 6,059,582 | A * | 5/2000 | Tsai | 439/121 |
| 6,068,214 | A * | 5/2000 | Kook et al. | 244/118.1 |
| 6,164,988 | A  | 12/2000 | Wagener | 439/110 |
| 6,411,500 | B1 * | 6/2002 | Kaaden et al. | 361/614 |
| 6,452,785 | B1 * | 9/2002 | Kaaden et al. | 361/622 |
| 6,536,966 | B1 * | 3/2003 | Butler | 400/492 |
| 6,790,058 | B2 * | 9/2004 | Schlieber | 439/110 |
| 7,173,809 | B2 * | 2/2007 | Bauer et al. | 361/611 |
| 7,446,635 | B2 * | 11/2008 | Stanke et al. | 335/160 |
| 7,601,013 | B2 * | 10/2009 | Wagener et al. | 439/110 |
| 7,690,952 | B2 * | 4/2010 | Koellmann et al. | 439/716 |
| 7,932,804 | B2 * | 4/2011 | Buettner | 337/196 |
| 7,942,692 | B2 * | 5/2011 | Bodenmeier | 439/511 |
| 8,021,171 | B2 * | 9/2011 | Buettner | 439/121 |
| 8,499,979 | B2 * | 8/2013 | Sand | 222/173 |
| 8,582,286 | B2 * | 11/2013 | Ulrich | 361/679.33 |

FOREIGN PATENT DOCUMENTS

| | | |
|---|---|---|
| DE | 20211940 U1 | 10/2002 |
| DE | 202004011736 U1 | 11/2004 |
| EP | 0917751 B1 | 2/2002 |

* cited by examiner

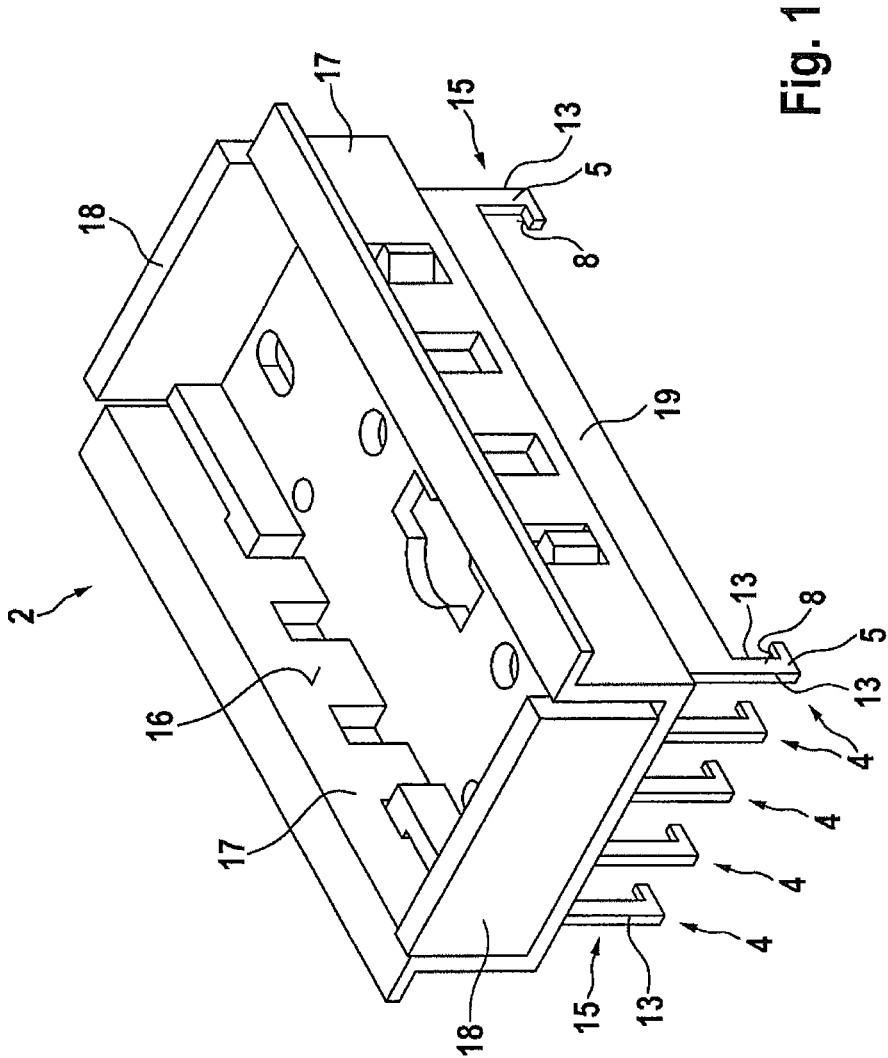

BUSBAR ADAPTER COMPRISING A MOUNTING RAIL FOR ATTACHING A SWITCHING DEVICE

BACKGROUND OF THE INVENTION

The invention relates to a busbar adapter comprising a mounting rail for attaching a switching device to the busbar adapter, wherein said mounting rail can be attached to the busbar adapter at different positions.

Generic busbar adapters are known in various embodiments, in particular in view of the attachment of the mounting rail to the busbar adapter.

DE 202 11 940 U1 discloses a busbar adapter wherein the mounting rail is clamped on the busbar by means of an actuating element which may be displaced during mounting with the aid of a screw driver.

It is known from DE 42 42 704 C2 to attach the mounting rail to the busbar adapter either directly with the aid of two screws or, instead of these screws, to provide dome-like hollow protrusions which are slotted in longitudinal direction. Thereby, it is provided that the mounting rail engages into provided openings of a hole rail of the busbar adapter with its dome-like protrusions, wherein dowels or expanding pins are forced into the dome-like protrusions for attaching the mounting rail.

Another category of generic busbar adapters uses mounting rails which may be removable latched to the busbar adapter. In the busbar adapter according to DE 195 15 922 C1, a locking lever, connected to the mounting rail, is provided, which engages interlocking teeth of the busbar adapter when the mounting rail is brought in connection with the busbar adapter and is displaced in a passing direction for positioning. At a free end of the locking lever, depressions are arranged into which a screw driver or the like may be inserted, to lift the locking lever for releasing the latch connection.

Also EP 0 917 751 B1 describes a busbar adapter wherein the mounting rail is retained via a latch connection, wherein a resilient tongue is provided at the mounting rail which automatically locks to the housing and which in a state where the mounting rail is attached at the housing extends with its free end beyond an end face of the mounting rail. The slider comprises a means extending beyond the end face of the mounting rail and by means of which the latch connection between the busbar adapter and the mounting rail may be released. That means, in turn, is configured to be actuated for example with the aid of a screw driver. A corresponding latch connection which may be released with the aid of such means is also known from DE 20 2004 011 736 U1.

An essential disadvantage of a busbar adapter known from the prior art consists in that at least for releasing locking between the busbar adapter and a mounting rail sitting on it, always technical tools such as, for example, screw drivers or the like, are needed.

SUMMARY OF THE INVENTION

It is the object of the invention to propose a generic busbar adapter comprising a mounting rail for attaching a switching device wherein both locking of the mounting rail at the busbar adapter and releasing of the locking is possible without the use of technical tools.

The busbar adapter according to the invention is characterized in that the mounting rail comprises leg elements and the busbar adapter comprises passages through which a respective one of the leg elements of the mounting rail extends with a latch form a first boundary surface of the passages on which the mounting rail rests, to a second boundary surface of the passages such that the respective latch of the leg elements is, with a retaining surface thereof, arranged in a distance to the second boundary surface which corresponds to a dimension of a slider positively insertable between the retaining surface and the second boundary surface.

Locking or releasing the locking, respectively, may be performed exclusively manually by inserting or extracting a substantially plate-shaped slider. Preferably, the slider is configured substantially rectangular and comprises a thickness which exactly corresponds to the distance between the second boundary surface of the passages and a retaining surface of the latch. Thus, when inserting the slider, the space resulting from the distance between the second boundary surface and the retaining surface is precisely filled by the slider, so that a frictional connection between mounting rail and busbar adapter is produced. It shows that the first and the second boundary surfaces lie in a plane in which a first or a second end, respectively, of the passage lies.

In a preferred embodiment of the invention, the passages are respectively formed by spaced apart cams at two parallel running walls of the busbar adapter. Thus, the passages correspond to this space which is formed between neighbouring cams. The distance of the cams, therefore, is configured such that the resulting space is appropriate for passage of a leg element of the mounting rail. Preferably, the cams are spaced apart such that the leg elements protrude positively through the passages. In this embodiment, the boundary surfaces are formed by respective first and second surfaces of the cams which lie in a plane in which a first or a second end, respectively, of the passages lies.

In a preferred embodiment, it is furthermore provided that the cams comprise free ends, wherein the free ends of the cams of both walls are oriented towards the respective other wall. Thereby, the cams are connected with their respective end which is faced away from the free end, to the associated wall.

In a further embodiment of the invention it is provided that the mounting rail comprises two parallel rows of leg elements which are arranged equidistantly to another. Furthermore, the busbar adapter comprises two parallel rows of passages which are equidistantly arranged, wherein the distance corresponds to that of the leg elements. It is provided that the distance of the parallel rows of passages is identical to the distance of the parallel rows of leg elements. Preferably, the leg elements are provided at parallel longitudinal sides of the mounting rail, wherein leg elements may be provided over the entire length of said longitudinal sides. Thereby, an anti-twist locking of the mounting rail on the busbar adapter is possible.

For particularly stable attachment of the mounting rail at the busbar adapter it may be provided that at least one of the leg elements comprises a first guiding surface and a second guiding surface is arranged, viewed in insertion direction, in front of at least one of the passages, wherein the first and the second guiding surfaces are positively contacting each other when the mounting rail is attached to the busbar adapter. In this embodiment, the leg elements have, in addition to the function to produce a positive connection with the busbar adapter, the supplemental function to confer additional stability to the produced connection between both components, in particular in view of twists in a plane perpendicular to the insertion direction of the leg elements through the passages, by means of a positive connection between corresponding guiding surfaces of the leg element and the busbar adapter.

It is in particular preferred that the aforementioned embodiment is configured such that the leg elements comprise a shaft rectangular in cross section, of which three side faces are configured as first guide surfaces and the latch is formed at the fourth side face. Thereby, the passages should comprise substantially the same cross section as the leg elements, wherein, viewed in insertion direction, three second guiding surfaces are arranged in front of at least one of the passages, which at least in sections are positively contacting a respective one of the three first guiding surfaces when the mounting rail is attached to the busbar adapter. Since passages and leg elements comprise substantially the same rectangular cross section, the leg elements are allowed to pass through the passages in a specific relative orientation between the mounting rail and the busbar adapter. On the other hand, the rectangular cross section of the aforementioned components ensures that the mounting rail may be attached to the busbar adapter in two positions rotated by 180°.

Another embodiment of the invention provides that the mounting rail for receiving a switching device is formed at least in sections as a U beam having parallel inner surfaces of flanges thereof. The mounting rail is to comprise end pieces which can be latched in different positions in longitudinal direction of the U beam between the parallel inner surfaces of the flanges, wherein the end pieces in a direction perpendicular to the longitudinal direction of the U beam may comprise a dimension substantially corresponding to the distance of the parallel inner surfaces of the flanges. Thus, it is provided in this embodiment that the switching device is received in a space which is bound by the parallel inner surfaces of the flanges on the one hand and of the selectively latchable end pieces on the other hand. Thus, the space is fixed in a direction perpendicular to the parallel inner surfaces, however, may be adjusted in longitudinal direction by varying the position of the end pieces. It is appropriate to provide latch positions for the end pieces in which the end pieces delimit a dimension in longitudinal direction corresponding to a respective dimension of a switching device to be received by the mounting rail.

Since in the aforementioned embodiment the space delimited by the mounting rail is fixed perpendicular to the parallel inner surfaces of the flanges of the U beam, it is provided in another embodiment of the invention that the leg elements are provided at a base plate of the mounting rail on which the U beam, configured as a separate component, can be locked. If now, a mounting rail being given, the space delimited between the parallel inner surface of the flanges of a U beam of the mounting rail, is not sufficient to receive a switching device to be attached, it is provided in the aforementioned embodiment that the mounting rail is assembled using a base plate at which the leg elements are provided and a U beam configured as a separate component. The U beam of the mounting rail, therefore, may be exchanged and adjusted to the switching device to be received.

BRIEF DESCRIPTION OF THE DRAWINGS

Further details of the invention are illustrated with the aid of the figures below, where:

FIG. 1 shows a perspective view of a mounting rail according to the invention;

DETAILED DESCRIPTION OF THE INVENTION

Figure 2A:
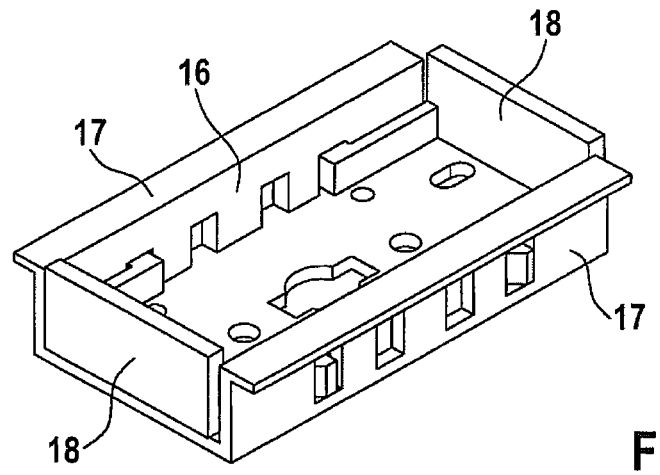
FIGS. 2a-2c are perspective views of a U beam having displaceable end pieces in three different latching positions.

FIG. 1 shows a mounting rail 2 according to the invention consisting substantially of a base plate 19 and a U beam attached thereto, wherein the U beam comprises two flanges 17 including parallel running inner surfaces 16. End pieces 18 are provided to be variably latched in longitudinal direction of the U beam. Further, leg elements 4 are formed at base plate 19 which comprise a shaft 15 having essentially rectangular cross section, wherein three of the side faces of shaft 15 are formed as first guiding surfaces 13 and a latch 5 is formed at the fourth guiding surface 13. Guiding surfaces 13 are provided to positively contact corresponding second guiding surfaces of the busbar adapter when mounting rail 2 is positioned on a busbar adapter. At the free ends of leg elements 4, a respective latch 5 is provided which includes a retaining surface 8. The retaining surface 8 is in so far essential for the invention, as it is embodied to form a distance in an inserting state of the mounting rail 2 on a busbar adapter between the retaining surface and a second boundary surface of the busbar adapter which corresponds to a dimension of a slider which may be positively inserted between retaining surface 8 of latch 5 and the second boundary surface.

It may also be recognized that mounting rail 2 comprises two parallel rows of leg elements 4 wherein at least the row elements 4 of a same row are arranged equidistantly to another. Preferably, the distance of all pairs of neighbouring leg elements 4 of both rows is identical.

Figure 2B:
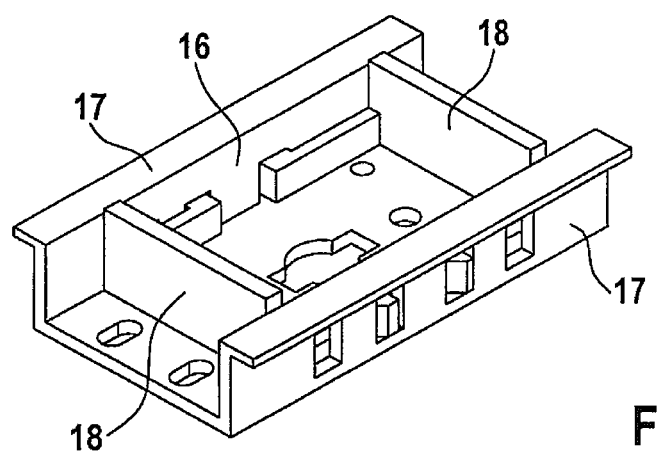
Figure 2C:
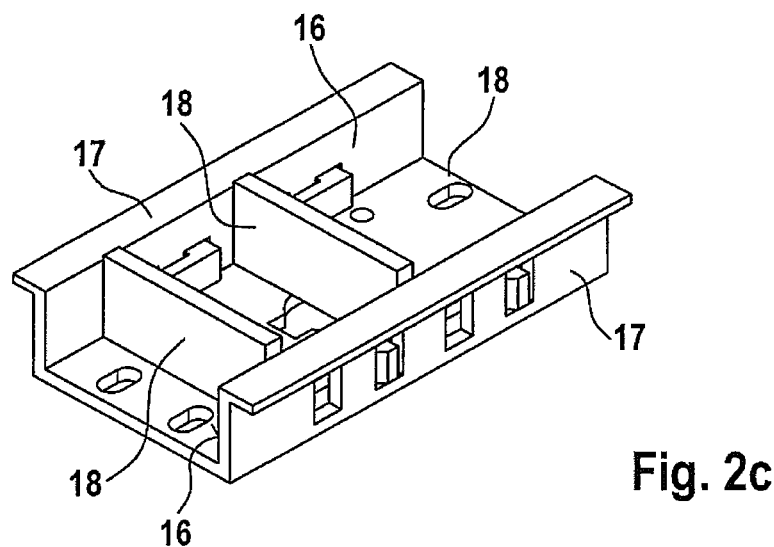

FIGS. 2a-2c show three perspective views of a U beam of a mounting rail according to the invention, wherein in each of the views as shown end pieces 18 for receiving a switching device of a specific dimension are latched in corresponding positions. It may be recognized that the U beam comprises parallel inner surfaces 16 of flanges 17 thereof, wherein end pieces 18 may be latched in different positions in longitudinal directions of the U beam between parallel inner surfaces 16 of flanges 17. It is appropriate to size the end pieces 18 such that they comprise a dimension substantially corresponding to the distance of the parallel inner surfaces 16 of flanges 17.

Figure 3B:
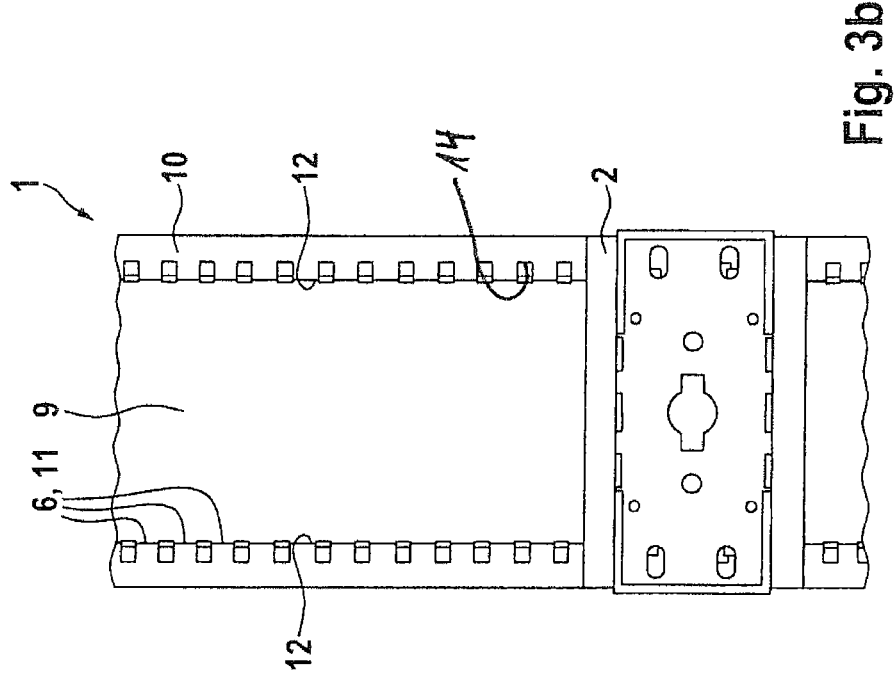
FIGS. 3a and 3b are top views of a busbar adapter according to the invention, with inserted and not inserted slider.
Figure 3A:
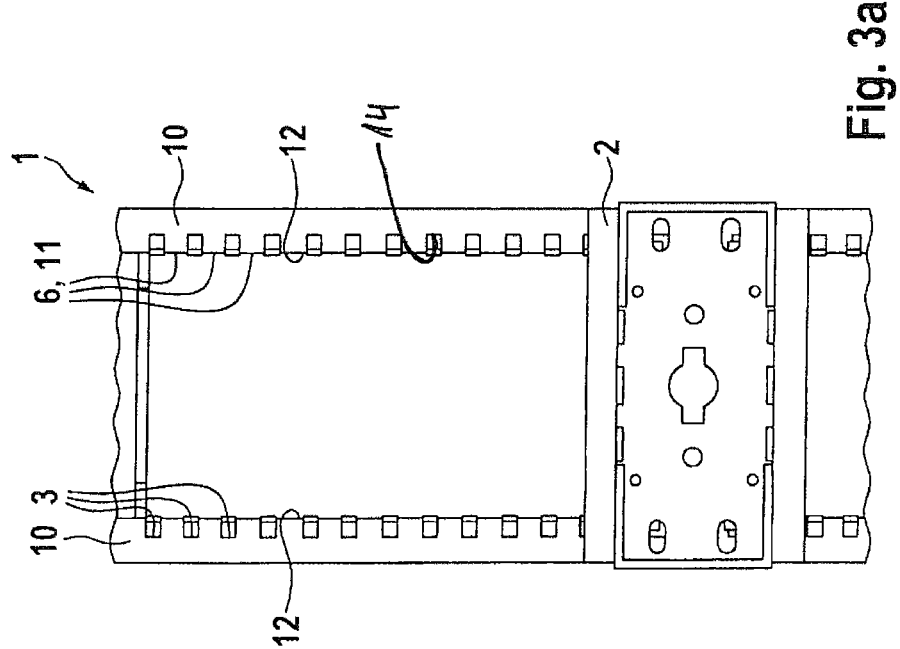

FIG. 3a shows a top view of a busbar adapter 1 according to the invention with attached mounting rail 2, where, however, a slider for fixing the mounting rail 2 has not yet been inserted. FIG. 3b shows the busbar adapter 1 with attached mounting rail 2 according to FIG. 3a, wherein in FIG. 3b a slider 9 for fixing the mounting rail 2 is inserted. It may be recognized that slider 9 engages behind cams 11 in the top view and thus prevents releasing of leg elements, not illustrated, of mounting rail 2, since slider 9 in turn is engaged by latches of leg elements of the mounting rail (not illustrated) on the rear side. It may also be recognized that cams 11 comprise free ends 12, wherein free ends 12 of cams 11 of both walls 10 are oriented towards the respective other wall 10.

Figure 4A:
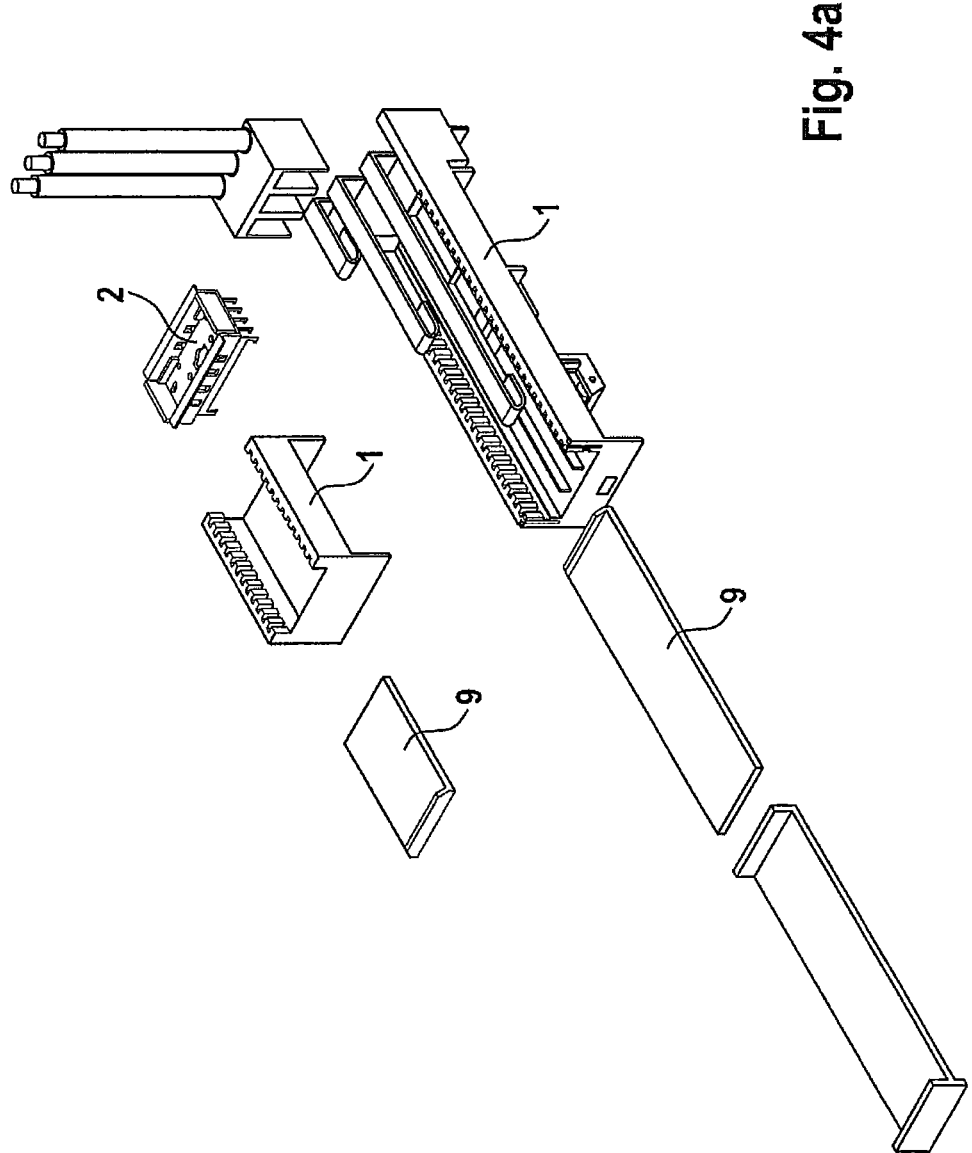
FIGS. 4a and 4b are perspective views of a busbar adapter according to the invention in an exploded view and in an assembled state.
Figure 4B:
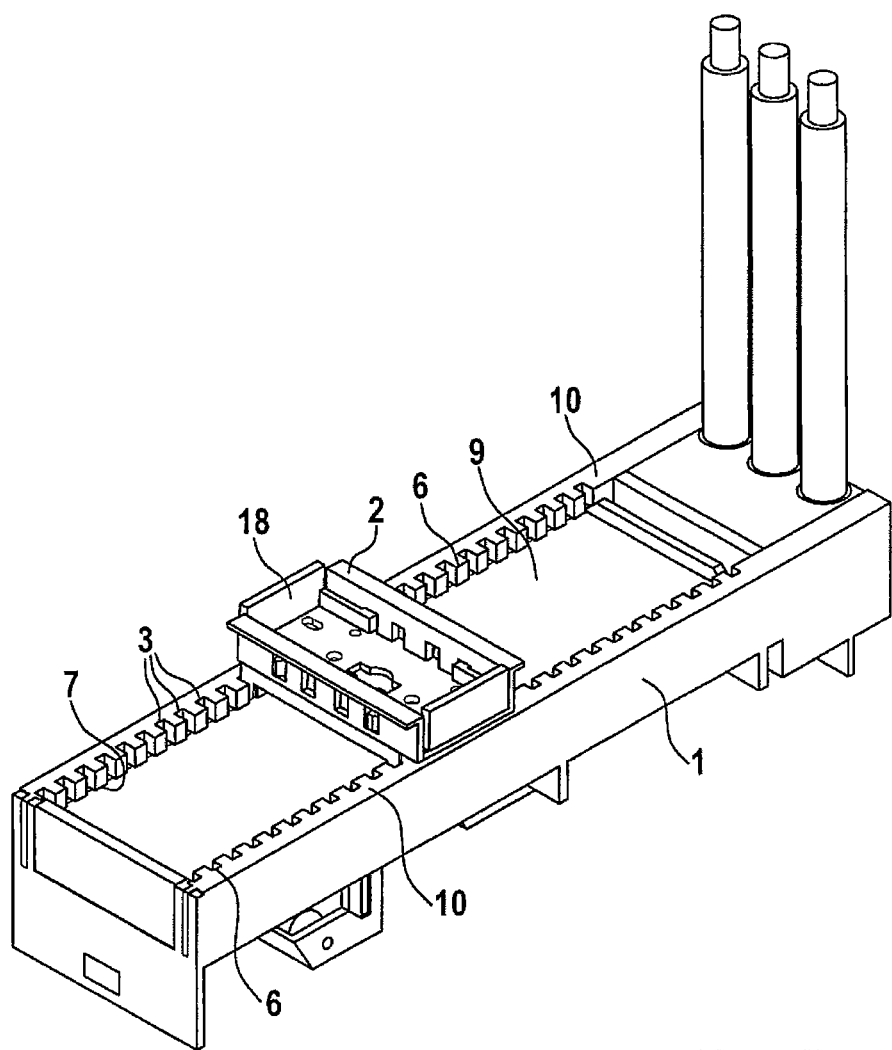

FIGS. 4a and 4b illustrate once more a busbar adapter 1 with mounting rail 2 according to the invention, wherein FIG. 4b shows the fixed state, i.e. with inserted slider 9. It may also be recognized in the illustration of FIG. 4b that passages 3 at two parallel running walls 10 of busbar adapter 1 are respectively formed by spaced apart cams 11. The cams comprise a first boundary surface 6 and a second boundary surface 7, wherein in the state shown in FIG. 4b second boundary surfaces 7 contact slider 9 to produce a frictional connection of busbar adapter 1 with mounting rail 2.

The invention claimed is:

1. A busbar adapter, comprising a mounting rail for attaching a switching device to the busbar adapter, wherein said mounting rail can be attached to the busbar adapter at different positions, characterized in that the mounting rail comprises leg elements and the busbar adapter comprises passages through which a respective one of the leg elements of the mounting rail extends with a latch from a first boundary surface of the passages on which the mounting rail rests, to a second boundary surface of the passages such that the respective latch of the leg elements is, with a retaining surface thereof, arranged in a distance to the second boundary surface which corresponds to a dimension of a slider positively insertable between the retaining surface and the second boundary surface.

2. The busbar adapter of claim 1, wherein the passages are respectively formed by spaced apart cams at two parallel running walls of the busbar adapter.

3. The busbar adapter of claim 2, wherein the cams comprise free ends, wherein the free ends of the cams of both walls are oriented towards the respective other wall.

4. The busbar adapter of claim 1, wherein the mounting rail comprises two parallel rows of equidistantly spaced leg elements and the busbar adapter comprises two rows of equidistantly spaced passages, the distance corresponding to that of the leg elements, wherein the distance of the parallel rows of passages corresponds to the distance of the parallel rows of leg elements.

5. The busbar adapter of claim 1, wherein at least one of the leg elements comprises a first guiding surface, and a second guiding surface is arranged, viewed in insertion direction, in front of at least one of the passages, wherein the first and the second guiding surfaces are positively contacting each other when the mounting rail is attached to the busbar adapter.

6. The busbar adapter of claim 1, wherein the mounting rail for receiving a switching device is formed at least in sections as a U beam having parallel inner surfaces of flanges thereof, comprising end pieces which can be latched in different positions in longitudinal direction of the U beam between the parallel inner surfaces of the flanges.

7. The busbar adapter of claim 6, wherein the leg elements are provided at a base plate of the mounting rail, on which the U beam, configured as a separate component, can be locked.

* * * * *